Figure 1:
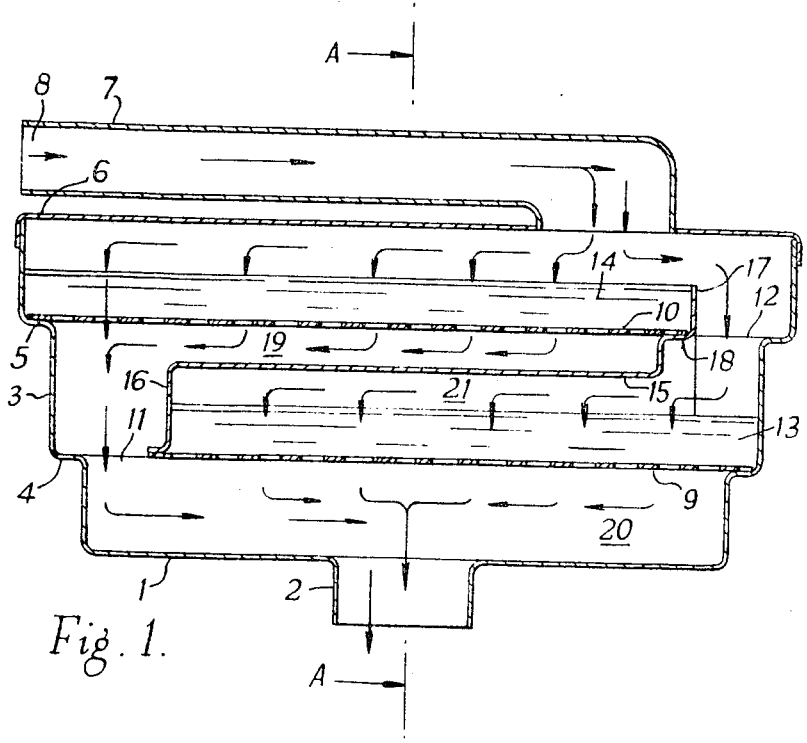

Sept. 13, 1966  P. W. STRIPP  3,271,937

FLUID FILTERS FOR INTERNAL COMBUSTION ENGINES

Filed July 18, 1963

INVENTOR:
Peter
William
BY Stripp

Mason, Kolehmainen, Rathburn & Wyss ATTORNEYS 3,271,937
FLUID FILTERS FOR INTERNAL COMBUSTION ENGINES
Peter William Stripp, Plymouth, Devon, England, assignor to Tecalemit (Engineering) Limited, Plymouth, Devon, England
Filed July 18, 1963, Ser. No. 296,072
Claims priority, application Great Britain, July 19, 1962, 27,916/63
2 Claims. (Cl. 55—307)

This invention relates to fluid filters, including especially filters for gases. The invention is especially applicable to and will be more fully described as applied to air cleaners for internal combustion engines, although it is also applicable to filters for other purposes.

When designing filters for use as air cleaners for internal combustion engines, as well as for other purposes, the need often arises to provide a substantial filtration area while keeping the external dimensions of the filter within limits. It is one of the objects of the present invention to provide a filter which can be made of compact construction while providing a considerable area of filtration material.

A further object of the invention is to provide a method of arranging and supporting filtration material within a filter casing which, besides enabling the overall dimensions to be kept down, also makes it possible to adapt the design of the filter when special space requirements have to be met, for example when the height of the filter has to be kept within restricted limits.

A still further object of the invention is to provide a novel and improved fluid filter which comprises a filter casing having an inlet and an outlet for the fluid to be filtered, at least two filter elements each of which includes an extended layer of filter material, support means for supporting the filter elements within the casing with the elements spaced from but in overlapping relation with respect to each other and means defining fluid passages within the casing such that one part of the fluid being filtered passes through and is filtered by one of the elements, by-passing the other, while another part of the fluid passes through and is filtered by another of the elements, by-passing the first said element.

Preferably the filter elements are arranged in stepped relation within the casing such that a space is left between end edge of each filter element and the wall of the casing for the flow past that element of part of the fluid which is being filtered by another filter element, the spaces between the edges of adjacent filter elements and the walls of the casing being located towards opposite sides or ends of the casing.

As will appear from the following description, the invention provides a filter which is compact, although it can contain a substantial area of filtration material. Furthermore the filter can be constructed economically and can be assembled or dismantled easily and quickly, for example when the filtration material needs to be cleaned or replaced.

Figure 2:
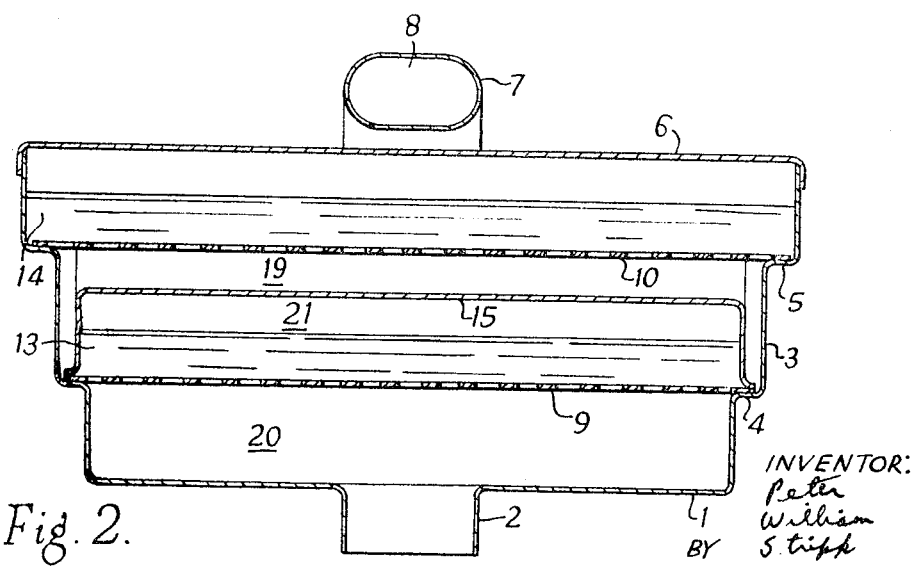

For the better understanding of the invention an air filter for an internal combustion engine will now be described, by way of example. Reference will be made to the accompanying drawing, in which:

FIGURE 1 is a vertical section through the filter;
FIGURE 2 is a section taken on the line A—A of FIGURE 1.

Referring to the drawing, the filter shown comprises a casing 1 having a bottom outlet 2 for the filtered air. This outlet is intended to be fitted to the air inlet of an internal combustion engine, such as the engine of a motor vehicle. The casing itself may be of square or other rectangular shape, when viewed in plan, while other shapes are also possible, including circular.

The side (including the end) walls 3 of the casing 1 are of an outwardly stepped construction, two steps 4 and 5 being shown. These steps are designed to support the filter material and associated parts, as will be described.

The top of the casing 1, which is larger than the bottom thereof, owing to the stepped shape of the casing, is fitted with a cover 6 carrying an air inlet tube 7. As shown, the end 8 of the tube 7 through which air enters is located near one side (or end) of the filter casing, while the tube 7 opens into the top of the casing 1 towards the other side (or end) thereof.

The steps 4 and 5 in the casing 1 carry filter supports 9 and 10, respectively, each of which supports is wide enough to extend across the full width of the casing in one direction, as shown in FIGURE 2, but is made shorter or narrower in the other direction so that spaces 11 and 12, respectively (FIGURE 1) are left for the passage of that proportion of the air which is by-passing that particular filter element.

The supports 9 and 10, which are made of perforated metal, wire mesh or other openwork material through which the filtered air can pass, carry filter pads 13 and 14, respectively. These pads may be formed of any of a number of materials, but it is preferred to use pads made of an intermingled mass of fibres, particularly fibres of synthetic origin. Among the fibres which are preferred and which give particularly good results, are those which are known by the name "Dynel" and which are formed of a copolymer of vinyl chloride and acrylonitrile.

Alternatively, each filter element may be made of a sheet or of a stack of sheets, which may be pleated, of a filter paper or the like. A felt or felt-like filter material could also be used.

Fitted in the casing 1 and supported by the step 4, where it actually rests on the support 9, is a dividing wall 15, which may be made of sheet metal. When viewed in the direction of FIGURE 1, this wall 15 is of stepped form, having vertical portions 16 and 17 which are engaged by the edges of the filter pads 13 and 14, dividing the latter from the openings 11 and 12 respectively, while it also includes a step 18 which helps to carry the support 10.

Considering the operation of the filter, air enters the inlet tube 7 at the open end 8 of the latter, whence it is drawn into the filter casing. As is shown by the arrows in FIGURE 1, part of the air then passes through and is filtered by the element 14, from which it is drawn out through the support 10, through the space 19 between this support and the dividing wall 15 and through the opening 11 into the space 20 below the lower support 9, whence it is drawn into the engine through the outlet 2.

The remainder of the air, instead of passing through the filter element 14, passes through the opening 12 into the space 21 above the filter element 13 and below the dividing wall 15. This air is then drawn through and filtered by the element 13, whence it passes through the space 20 to the outlet 2.

It will thus be seen that the present invention provides a filter containing a number of layers of filter material which are arranged in a compact manner, one above the other, within a common casing and in which the air or other fluid being filtered divides into a number of streams, each of which streams is made to pass through one filter element and one only.

It should be noted that for best results restrictions in the passages or spaces in the filter casing through which the fluid being filtered passes on its way to the filter elements and after leaving the latter, which might tend to cause undesirable Venturi effects within the filter, should be avoided. In general the cross-sectional areas of these passages and spaces should nowhere be less than that of the outlet 2.

The invention has been described as applied to a filter having only two filter elements but it could also be applied to filters having more than two such elements.

I claim:
1. A fluid filter for internal combustion engines comprising:
   a generally rectangular casing defined by vertical side walls and top and bottom walls and having inlet and outlet openings for the fluid to be filtered, said inlet opening being located in said top wall and said outlet opening in the said bottom wall, the side walls of said casing being stepped such that the cross sectional area of said casing increases from the bottom towards the top thereof to provide at least a pair of steps, each such pair defining a shelf along the inner surface of the side walls with the upper shelf being spaced outwardly of the lower shelf;
   a first generally flat filter support resting on the portion of the upper shelf defined by one side wall and by portions of the adjacent side walls and having a free edge spaced from the side wall opposite said one side wall;
   a second generally flat filter support resting on the portion of the lower shelf defined by said opposite side wall and portions of said adjacent side walls and having a free edge spaced from said one of said side walls;
   filter pads of intermingled fibers carried by each of said supports and generally coextensive therewith; and
   a dividing wall with a portion spaced generally parallel between said supports and effectively extending between said adjacent side walls and having a first vertical portion adjacent one end connected to said free edge of the first one of said supports and having means defining a step upon which said free edge rests and having a second vertical portion adjacent the other end connected to said free edge of said second of said supports.
2. A fluid filter as set forth in claim 1 above wherein said one of said openings is located near said opposite side, and a tube extends from said opening towards the other side thereof.

References Cited by the Examiner

UNITED STATES PATENTS

| | | | |
|---|---|---|---|
| 154,645 | 9/1874 | Chase | 55—494 X |
| 1,316,144 | 9/1919 | Craven | 55—484 X |
| 1,521,576 | 12/1924 | Wittemeier | 55—350 |
| 1,522,111 | 1/1929 | Franck-Philipson | 55—482 X |
| 1,946,744 | 2/1934 | Jones et al. | 55—308 |
| 2,886,129 | 5/1959 | Streete | 55—276 |
| 3,154,393 | 10/1964 | Klein et al. | 55—501 |

ROBERT F. BURNETT, *Primary Examiner.*